United States Patent
Talanki et al.

(10) Patent No.: US 11,436,379 B2
(45) Date of Patent: Sep. 6, 2022

(54) METHOD TO ISSUE WRITE PROTECT COMMANDS ON DYNAMIC RANDOM-ACCESS MEMORY (DRAM) CELLS IN A SYSTEM RUN-TIME ENVIRONMENT

(71) Applicant: SAMSUNG ELECTRONICS CO., LTD., Suwon-si (KR)

(72) Inventors: Raghu Vamsi Krishna Talanki, Bangalore (IN); Krishna Mogilipuvvu, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 432 days.

(21) Appl. No.: 16/550,578

(22) Filed: Aug. 26, 2019

(65) Prior Publication Data

US 2020/0104535 A1  Apr. 2, 2020

(51) Int. Cl.
| | |
|---|---|
| *G06F 21/79* | (2013.01) |
| *G06F 9/4401* | (2018.01) |
| *G06F 21/57* | (2013.01) |
| *G06F 13/16* | (2006.01) |
| *G06F 12/10* | (2016.01) |
| *G06F 12/0804* | (2016.01) |

(52) U.S. Cl.
CPC ............ *G06F 21/79* (2013.01); *G06F 9/4401* (2013.01); *G06F 12/0804* (2013.01); *G06F 12/10* (2013.01); *G06F 13/1668* (2013.01); *G06F 21/572* (2013.01); *G06F 2212/1052* (2013.01); *G06F 2212/65* (2013.01); *G06F 2221/034* (2013.01)

(58) Field of Classification Search
CPC .... G06F 21/79; G06F 9/4401; G06F 12/0804; G06F 12/10; G06F 13/1668; G06F 21/572; G06F 2212/1052; G06F 2212/65; G06F 2221/034; G06F 12/145; G06F 21/575; G06F 12/1425; G06F 12/023
See application file for complete search history.

(56) References Cited

U.S. PATENT DOCUMENTS

| | | | |
|---|---|---|---|
| 8,635,394 B2 | 1/2014 | Klint et al. | |
| 8,799,624 B1* | 8/2014 | Griffin | G06F 9/3004 |
| | | | 712/29 |
| 10,565,141 B1* | 2/2020 | Chaiken | G06F 13/24 |
| 2012/0036308 A1 | 2/2012 | Swanson et al. | |
| 2019/0095343 A1* | 3/2019 | Gopal | G06F 12/1036 |
| 2019/0212999 A1* | 7/2019 | Chen | G06F 3/0659 |

* cited by examiner

*Primary Examiner* — Mohammad W Reza

(74) *Attorney, Agent, or Firm* — Volentine, Whitt & Francos, PLLC

(57) ABSTRACT

A method for securing one or more cells of a dynamic random-access memory (DRAM) device embedded in a system includes: (1) triggering, by one of a boot loader, an operating system (OS) and an application, a system management interrupt (SMI), (2) invoking, by a basic input/output system (BIOS), a BIOS SMI handler, (3) converting a physical address of secure data to a DRAM address using a reliability, availability and serviceability (RAS) protocol of a BIOS, and (4) performing a write protect operation on the secure data present in the DRAM device by issuing a device-supported security command in a BIOS SMI service routine.

15 Claims, 5 Drawing Sheets

METHOD TO ISSUE WRITE PROTECT COMMANDS ON DYNAMIC RANDOM-ACCESS MEMORY (DRAM) CELLS IN A SYSTEM RUN-TIME ENVIRONMENT

PRIORITY

This application claims priority, under 35 U.S.C. § 119, from Indian Patent Application No. 201841037178 filed on Oct. 1, 2018, in the Indian Patent Office, the entire contents of which are incorporated herein by reference.

FIELD OF THE ART

The present disclosure relates in general to a system and method for issuing write protect commands on dynamic random-access memory (DRAM) cells in a system run-time environment.

BACKGROUND OF THE DISCLOSURE

Generally, dynamic random-access memory (DRAM) is a type of random-access memory used in computing devices (primarily personal computers (PCs)). DRAM stores each bit of data in a separate passive electronic component (capacitor) that is inside an integrated circuit board. Each electrical component in DRAM has two states of value in one bit called 0 and 1. DRAM has one capacitor and one transistor per bit as opposed to static random-access memory (SRAM) that requires 6 transistors.

In recent years, with an advance in the semiconductor industry, application specific or next generation (Gen) DRAM memories are getting designed with security features to protect critical data access from unknown sources. The protection is given by restricting the write access to specific cells in the DRAM. In a system environment, the number of channels, the number of dual in-line memory module (DIMM) slots, and the number of DIMMs inserted plays a major role in the distribution of data in DRAM cells.

In a run-time environment, if a bootloader, an operating system or a user application has to write protect its data, it needs to know the distribution details of the data in DRAMs such as rows, columns, banks, ranks, DIMMs, channel, memory controller and socket. This distribution is dynamic in nature based on the configuration of system.

In view of the foregoing, there exists a need to provide a method and system which is adapted to secure cells of a DRAM device by identifying the distribution details of DRAM in a run-time environment irrespective of the configuration.

SUMMARY

Various embodiments herein describe a method for securing one or more cells of a dynamic random-access memory (DRAM) device embedded in a system. According to one embodiment, the method includes: (1) triggering, by one of a boot loader, an operating system (OS) and an application, a system management interrupt (SMI), (2) invoking, by a basic input/output system (BIOS), a BIOS SMI handler, (3) converting a physical address of secure data to a DRAM address using a reliability, availability and serviceability (RAS) protocol of a BIOS, and (4) performing a write protect operation on the secure data present in the DRAM device by issuing a device-supported security command in a BIOS SMI service routine.

According to another embodiment, a method for securing one or more cells of a DRAM device embedded in a system includes: (1) performing a booting operation, (2) checking for secure data in a boot loader, (3) flushing cache data when the secure data is processed in the boot loader, (4) triggering an SMI, (5) invoking a BIOS SMI handler, (6) converting a physical address of the secure data to a DRAM address using a RAS protocol of BIOS, and (7) performing a write protect operation on the secure data present in the DRAM device by issuing a device-supported security command in a BIOS SMI service routine.

According to an embodiment, a method for securing one or more cells of a DRAM device embedded in a system includes: (1) performing a booting operation, (2) checking for secure data in one of an application and an operating system, (3) flushing cache data when the secure data is processed in one of the application and the operating system, (4) converting a virtual address of the secure data to a physical address, (5) triggering an SMI, (6) invoking a BIOS SMI handler, (7) converting the physical address of the secure data to a DRAM address using a RAS protocol of a BIOS, and (8) performing a write protect operation on the secure data present in the DRAM device by issuing a device-supported security command in a BIOS SMI service routine.

The foregoing has outlined, in general, the various aspects of the disclosure and is to serve as an aid to better understand the more complete detailed description which is to follow. In reference to such, there is to be a clear understanding that the present disclosure is not limited to the method or application of use described and illustrated herein. It is intended that any other advantages and objects of the present disclosure that become apparent or obvious from the detailed description or illustrations contained herein are within the scope of the present disclosure.

BRIEF DESCRIPTION OF THE DRAWINGS

Other objects, features and advantages will occur to those skilled in the art from the following description of the preferred embodiment and the accompanying drawings in which.

Although specific features of the present disclosure are shown in some drawings and not in others, this is done for convenience only as each feature may be combined with any or all of the other features in accordance with the present disclosure.

DETAILED DESCRIPTION

The present disclosure provides a system and method for issuing write protect WP commands or removal of write protect RWP commands on dynamic random-access memory (DRAM) cells in a system run-time environment. In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following detailed description is, therefore, not to be taken in a limiting sense, and the scope of the present disclosure is defined only by the appended claims.

Figure 1:
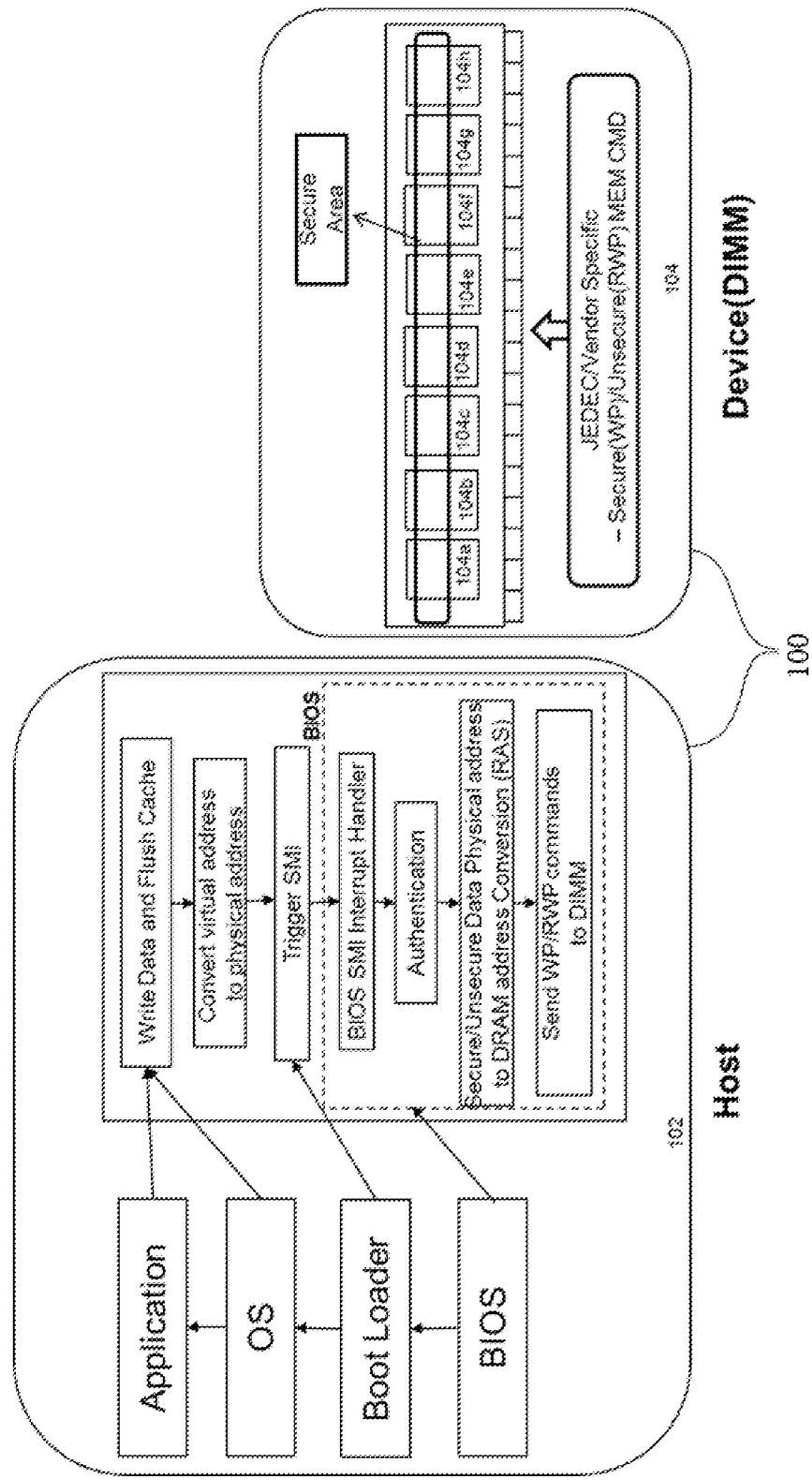
FIG. 1 is a system diagram illustrating invoking SMI on dynamic random-access memory (DRAM) cells in a system run-time environment, according to an embodiment of the present disclosure.

FIG. 1 is a system diagram illustrating a method of invoking a system management interrupt (SMI) for issuing write protect commands on DRAM (104) cells in a system run-time environment, according to an embodiment of the present disclosure. The system (100) includes a host (102) and DRAM device (104), which is embedded in the system. The DRAM device (DIMM) consists of multiple DRAM devices (104a to 104h) each of which consists of secure area. To secure one or more cells of the DRAM device (104) embedded in the system (100) during a run time environment, an SMI is triggered. Triggering the SMI causes one or more processors of a central processing unit (CPU) to enter into a system management mode (SMM). In the SMM, a first set of processors, among the one or more processors, serves to cause the SMI to perform the write protect operation and a second set of processors, among the one or more processors, wait for the first set of processors to exit from the SMI.

Further, triggering the SMI is performed by a boot loader, an operating system (OS), or an application and accordingly the data to be protected is also selected from the boot loader, the operating system, or the application of the host (102) based on a predefined condition or system requirement.

The SMI is used to offer extended functionality, such as legacy hardware device emulation. The SMI is also used for system management tasks. The SMI is similar to a non-maskable interrupt (NMI) in that a special electrical signaling line is being directly used with respect to the CPU and is generally not able to be masked. When the SMI is received, the CPU enters the SMM. In this mode, a very low-level handler routine is run to handle the SMIs. The SMM is typically provided directly from the system management firmware, often a basic input/output system (BIOS) or an extensible firmware interface (EFI).

Once the SMI is triggered, all the processors in the system enter into the SMM and only a relevant/associated processor serves the SMI and all remaining processors wait for the SMI serving processor to exit from the SMI. Further, all hardware interrupts are also disabled in the SMI so that a device interrupt handler code is not executed. The state of the CPU is also saved in a system management RAM (SMRAM) and restored upon exit of the SMI. To exit from an SMI, a resume from system management mode (RSM) instruction is used and is valid only in the SMI. The system flushes a cache before entering into the SMI by raising at least one clock of a FLUSH #pin before raising an SMI #pin.

In one embodiment of the present disclosure, a write protect operation is performed during running of the boot loader. According to the embodiment, a booting operation is performed and the boot loader is checked to find data to be secured. When the data to be secured is found and processed in the boot loader, cache data is flushed and then the SMI is triggered. Once the SMI is triggered, a physical address of the secure data is converted to a DRAM address using a reliability, availability and serviceability (RAS) protocol of BIOS and a write protection operation is performed on the secure data present in the DRAM device by issuing a device-supported security command in a BIOS SMI service routine. The system also removes the write protection on one or more cells of the DRAM device having the secure data based on a predefined instruction.

In another embodiment of the present disclosure, a write protect operation is performed during running of either an application or operating system. According to the embodiment, a booting operation is performed and the application or operating system is checked to find the data to be secured. Cache data is flushed when the secure data is processed in either the application or operating system. A physical address of the secure data is populated by converting a virtual address of the secure data. In the next step, the SMI is triggered. Once the SMI is triggered, a BIOS SMI handler is triggered by a BIOS and a physical address of the secure data is converted to a DRAM address using a RAS protocol of the BIOS. The write protect operation is performed on the secure data present in the DRAM device by issuing a device-supported security command in a BIOS SMI service routine. The system also removes the write protection on one or more cells of the DRAM device having the secure data based on a predefined instruction.

Figure 2:
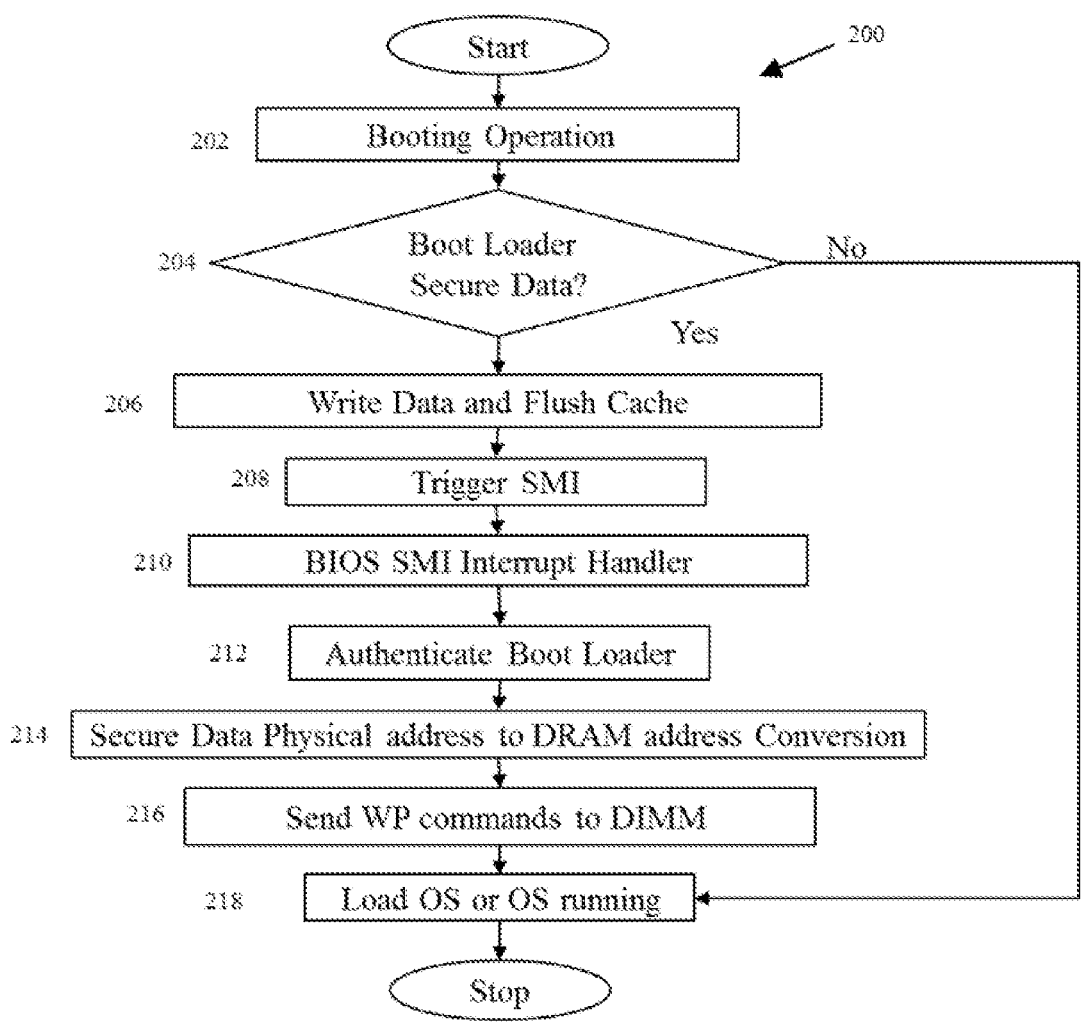
FIG. 2 is a flow chart illustrating a write protection operation for boot loader data, according to an embodiment of the present disclosure.

FIG. 2 is a flow chart 200 illustrating a write protection operation on boot loader data, according to an embodiment of the present disclosure. At step 202 a booting operation is performed. At step 204 a boot loader is checked to find the data to be secured. If there is no data to be secured, then an OS is loaded to run and the write protection process ends. If there is data to be secured, then at step 206 cache data is flushed. At step 208, an SMI is triggered. Once the SMI is triggered, then at step 210 a BIOS SMI handler is triggered. At step 212, boot loader authentication is done. Next at step 214, physical address of the secure data is converted to a DRAM address using a RAS protocol of BIOS. Next at step 216, a write protection operation is performed on the secure data present in the DRAM device by issuing a device-supported security command (e.g., WP commands) in a BIOS SMI service routine. Finally, at step 218, the OS is loaded to run with write protected DRAM cells.

Figure 3:
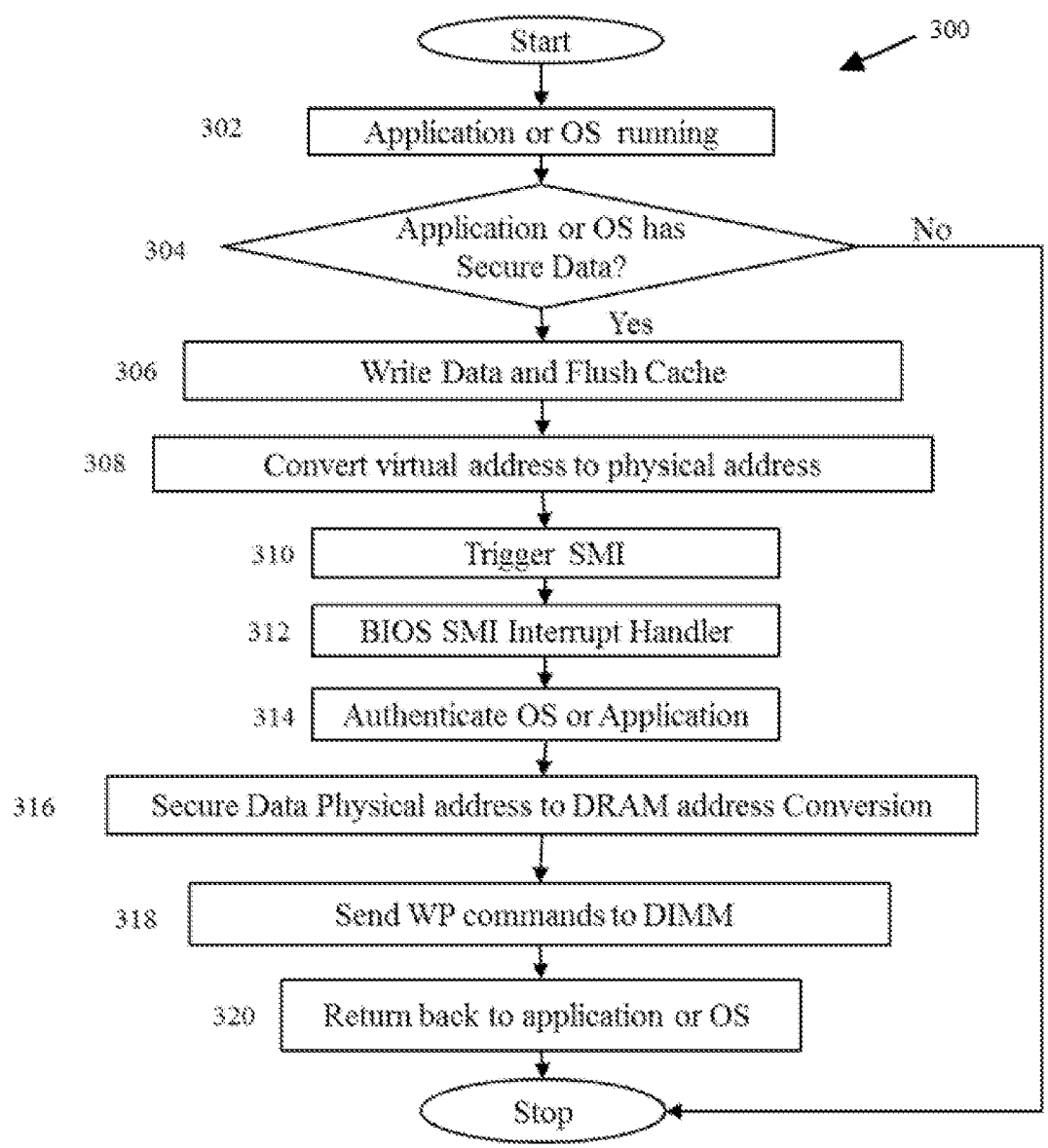
FIG. 3 is a flow chart illustrating a write protection operation on device for OS or application data, according to an embodiment of the present disclosure.

FIG. 3 is a flow chart 300 illustrating a write protection operation on device OS or application data, according to an embodiment of the present disclosure. At step 302, an application is started to run. At step 304, the application or the OS is checked to find if there is any data to be secured. If there is no data to be secured, then the method returns back to the OS or the application and write protection process ends. If there is data to be secured, then at step 306 cache data is flushed.

Further at step 308, the virtual address of the secure data is converted to a physical address of the secure data. At step 310, an SMI is triggered and then at step 312 a BIOS SMI handler is triggered. At step 314, authentication of application or OS is done to verify application can perform the operation or not. Further at step 316, a physical address of the secure data is converted to a DRAM address using a RAS protocol of BIOS. Next, at step 318, a write protection operation is performed on the secure data present in the DRAM device by issuing a device-supported security command in a BIOS SMI service routine. Finally, at step 320, the process returns back to the application or the OS with write protected DRAM cells.

Figure 4:
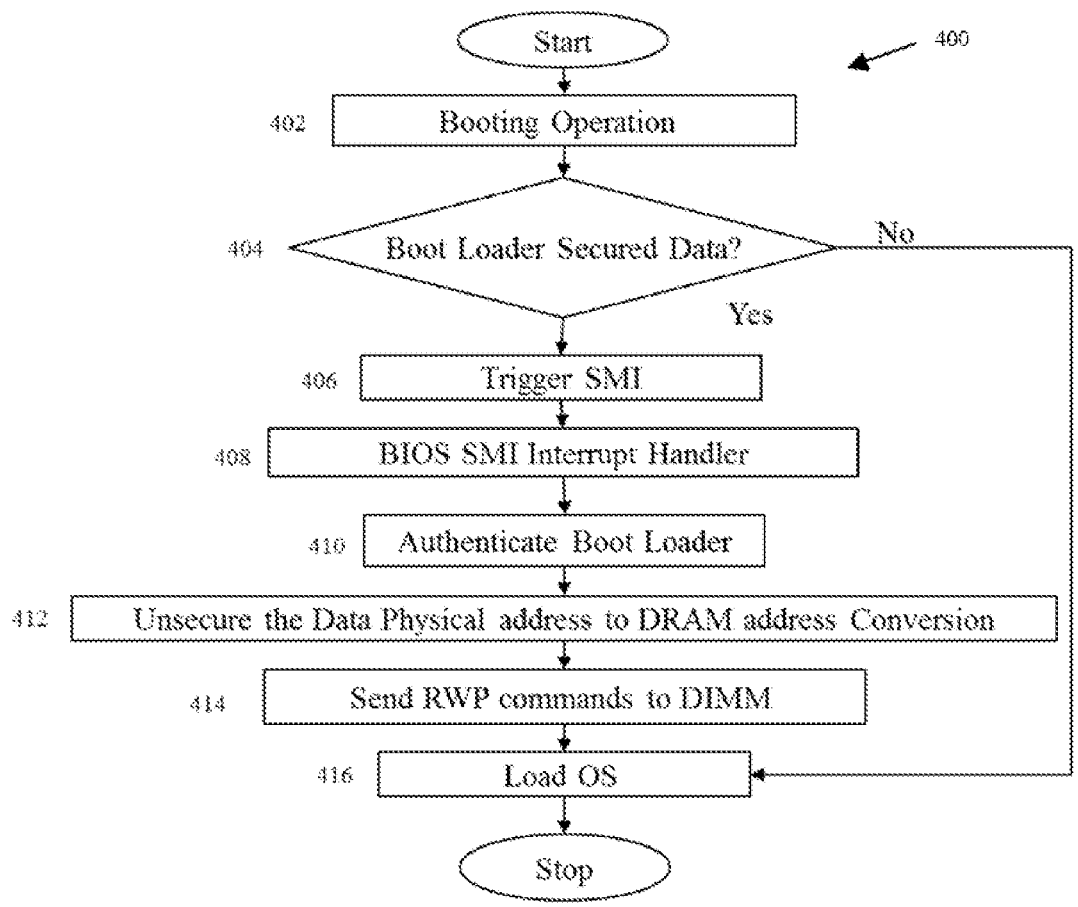
FIG. 4 is a flow chart illustrating a removal of write protection operation for boot loader data, according to an embodiment of the present invention.

FIG. 4 is a flow chart 400 illustrating a removal of write protection operation on a boot loader data, according to an embodiment of the present invention. At step 402, a booting operation is started. At step 404, a boot loader is checked to find the data that has been secured, if there is no secured data then OS is loaded to run and write protection process ends. At step 406, System Management Interrupt (SMI) is triggered. Once the SMI is triggered then at step 408 a basic input/output System (BIOS) SMI handler is triggered. At step 410, boot loader authentication is done. Next at step 412, physical address of the secure data is converted to a DRAM address using a reliability, availability and serviceability (RAS) protocol of BIOS. Next at step 414, a removal of write protection operation is performed on the secure data (write protected) present in the DRAM device by issuing a device supported Security CMDs in a BIOS SMI service routine. Finally, at step 416, Operating system is loaded to run with removed write protected DRAM cells.

Figure 5:
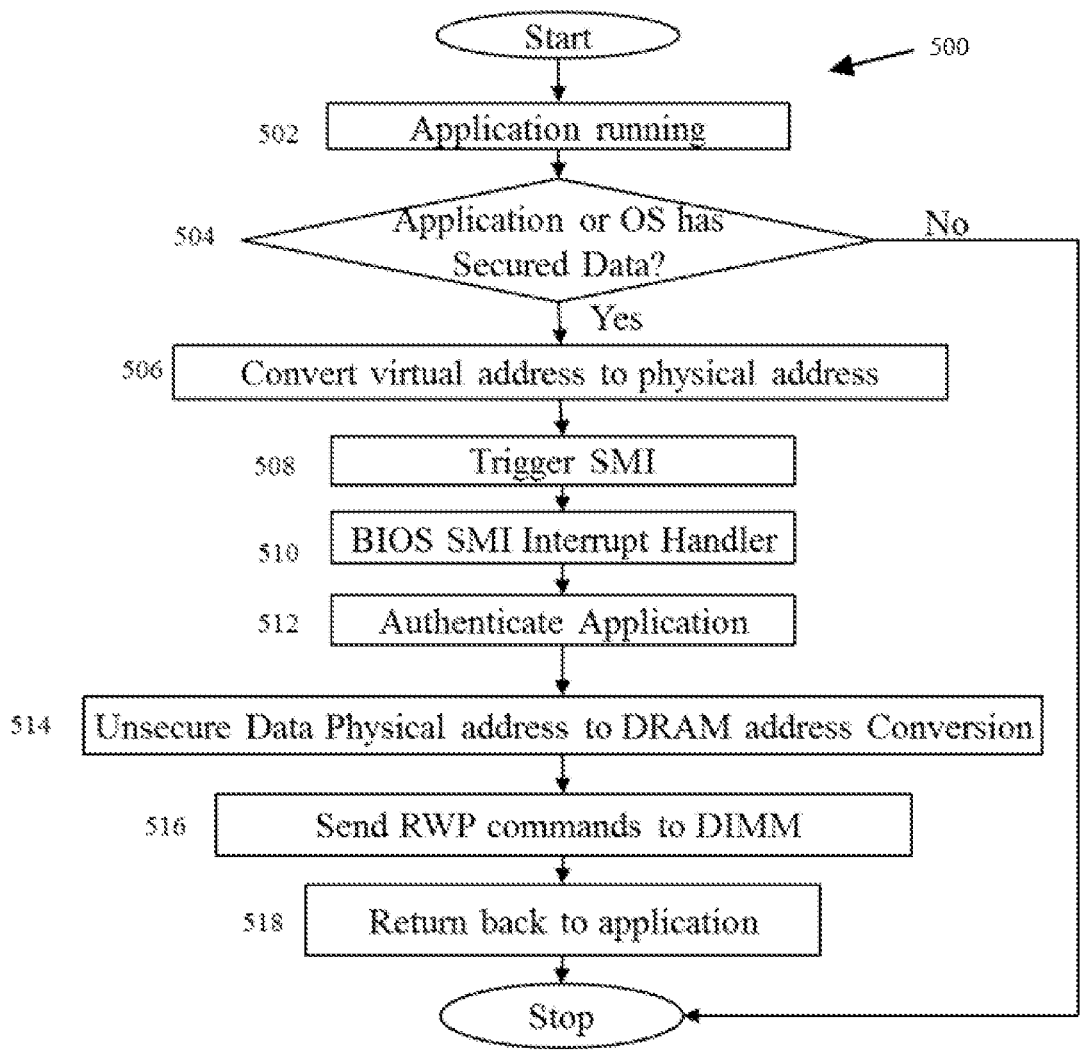
FIG. 5 is a flow chart illustrating a removal of write protection operation on device for OS or application data, according to an embodiment of the present invention.

FIG. 5 is a flow chart illustrating 500 a removal of write protection operation on a device application or OS data, according to an embodiment of the present invention. At step 502, an application or OS is started to run. At step 504, the application or OS is checked to find if there is any data that has been secured, if there is no data to that has been secured then it returns back to application and removal of write protection process ends. At step 506, the virtual address of the secured data is converted to physical address of the secured data. At step 508 a system management interrupt (SMI) is triggered and once the SMI is triggered then at step 510 a basic input/output System (BIOS) SMI handler is triggered. At step 512, authentication of application or OS is done to verify application can perform the operation or not. Further at step 514 a physical address of the secure data is converted to a DRAM address using a reliability, availability and serviceability (RAS) protocol of BIOS. Next at step 516, a removal of write protection operation is performed on the secure data present in the DRAM device by issuing a device supported Security CMDs (RWP CMDs) in a BIOS SMI service routine. Finally, at step 518, the process returns back to application with removed write protected DRAM cells.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the specification has been described in detail with respect to specific embodiments of the disclosure, it will be appreciated that those skilled in the art, upon attaining an understanding of the foregoing, may readily conceive of alterations to, variations of, and equivalents to these embodiments. These and other modifications and variations to the present disclosure may be practiced by those of ordinary skill in the art, without departing from the scope of the present disclosure. Furthermore, those of ordinary skill in the art will appreciate that the foregoing description is by way of example only and is not intended to limit the disclosure. Thus, it is intended that the present subject matter covers such modifications and variations.

What is claimed is:

1. A method for securing one or more cells of a dynamic random-access memory (DRAM) device embedded in a system, the method comprising:
    triggering, by one of a boot loader, an operating System (OS) and an application, a system management interrupt (SMI);
    invoking, by a basic input/output system (BIOS), a BIOS SMI handler;
    converting a physical address of secure data, stored in the DRAM device, to a DRAM address using a reliability, availability and serviceability (RAS) protocol of the BIOS; and
    performing a write protect operation on the secure data by issuing a device-supported security command in a BIOS SMI service routine, wherein:
    triggering the SMI causes a first processor and a second processor of a central processing unit (CPU) to enter a system management mode (SMM) in which:
        the first processor performs the write protect operation, and
        the second processor waits for the first processor to exit the SMI.

2. The method of claim 1 further comprising removing write protection from a cell of the DRAM device based on a predefined instruction.

3. The method of claim 1, wherein the DRAM device comprises one of a secured DRAM (S-DRAM) and a managed DRAM (M-DRAM).

4. The method of claim 1 further comprising:
    terminating a cache operation on the DRAM device while performing security commands; and
    starting the cache operation upon completion of the security commands.

5. The method of claim 1, wherein triggering the SMI by authenticating a source includes one of the boot loader, the OS, and the application.

6. The method of claim 1, wherein the secure data is selected by one of the boot loader, the OS, and the application.

7. The method of claim 1, wherein the physical address of the secure data is derived from a virtual address of the secure data, when the SMI is triggered by the OS or application.

8. The method of claim 1, further comprising flushing cache data before performing the write protect operation.

9. The method of claim 1, wherein an instruction for the write protect operation is stored as part of the BIOS SMI service routine and executed according to an SMI program stored in a memory that stores the BIOS.

10. The method of claim 1, wherein the SMI is generated through a routine instruction in the boot loader or OS.

11. The method of claim 1 further comprising:
    exiting the BIOS SMI service routine after performing the write protect operation; and
    executing one of the boot loader, OS, and application.

12. The method of claim 2, wherein the removal of the write protection is triggered by one of the boot loader, the OS, and the application when the secure data is required to be modified.

13. The method of claim 2, wherein the removal of the write protection is triggered by one of the boot loader, the OS, and the application when security is not needed.

14. A method for securing one or more cells of a dynamic random-access memory (DRAM) device embedded in a system, the method comprising:
- performing a booting operation;
- checking for secure data, stored in the DRAM device, using a boot loader;
- flushing cache data when the secure data is processed in the boot loader;
- triggering a system management interrupt (SMI);
- invoking a basic input/output system (BIOS) SMI handler;
- converting a physical address of the secure data to a DRAM address using a reliability, availability and serviceability (RAS) protocol of a BIOS; and
- performing a write protect operation on the secure data by issuing a device-supported security command in a BIOS SMI service routine, wherein:
- triggering the SMI causes a first processor and a second processor of a central processing unit (CPU) to enter a system management mode (SMM) in which:
  - the first processor performs the write protect operation, and
  - the second processor waits for the first processor to exit the SMI.

15. The method of claim 14, further comprising removing write protection on a cell of the DRAM device storing the secure data based on a predefined instruction.

* * * * *